United States Patent [19]
Bucher et al.

[11] Patent Number: 5,696,797
[45] Date of Patent: Dec. 9, 1997

[54] DEMODULATOR WITH BASEBAND DOPPLER SHIFT COMPENSATION AND METHOD

[75] Inventors: William Alexander Bucher, Tempe; Mark Alan Kirschenmann; Joel Lloyd Gross, both of Chandler; Clay Garlen Jones, Gilbert, all of Ariz.

[73] Assignee: Motorola, Inc., Schaumburg, Ill.

[21] Appl. No.: 279,376

[22] Filed: Jul. 22, 1994

[51] Int. Cl.⁶ .................................................. H04L 27/06
[52] U.S. Cl. .................... 375/344; 375/376; 375/340; 375/326; 329/307; 455/164.1; 455/256
[58] Field of Search .......................... 375/376, 324, 375/327, 328, 329, 330, 333, 308, 326, 334, 357, 362, 261, 307, 306, 340, 344, 346, 323, 331, 335, 336, 364, 371, 375, 325; 455/164.1, 164.2; 364/724.8; 329/307, 304, 305, 306, 315, 318, 319, 323, 324, 325, 326, 358, 360, 361

[56] References Cited

U.S. PATENT DOCUMENTS

| | | | |
|---|---|---|---|
| 3,603,893 | 9/1971 | Hughes | 331/17 |
| 3,715,663 | 2/1973 | Laughlin et al. | 325/4 |
| 3,761,825 | 9/1973 | Hill | 455/303 |
| 4,463,452 | 7/1984 | Chase, Jr. | 367/134 |
| 4,466,108 | 8/1984 | Rhodes | 375/329 |
| 4,484,154 | 11/1984 | Pavin | 331/23 |
| 4,509,017 | 4/1985 | Andren et al. | 329/308 |
| 4,701,934 | 10/1987 | Jasper | 375/206 |
| 4,896,336 | 1/1990 | Henely et al. | 375/324 |
| 5,095,538 | 3/1992 | Durboraw, III | 455/71 |
| 5,184,241 | 2/1993 | Schwemmer | 359/161 |
| 5,272,446 | 12/1993 | Chalmers et al. | 329/304 |
| 5,355,092 | 10/1994 | Kosaka et al. | 329/304 |
| 5,369,378 | 11/1994 | Kosaka et al. | 332/104 |
| 5,535,249 | 7/1996 | Miyashita | 375/344 |

OTHER PUBLICATIONS

"VLSI–Implemented High Speed Digital Burst Modem–Applications For Satellite Video TDMA and Wireless LAN" by Yoichi Matsumoto, Kiyoshi Kobayashi, Tetsu Sakata, Kazuhiko Seki, Shuji Kubota and Shuzo Kato for 0–7803–1825–0/94 1994 IEEE.

Primary Examiner—Wellington Chin
Assistant Examiner—William Luther
Attorney, Agent, or Firm—Frederick M. Fliegel

[57] ABSTRACT

An apparatus and accompanying method for demodulating with baseband Doppler frequency shift compensation. An RF section (20) down-converts received data communication signals (12) to baseband. A/D converters (24, 26) digitize I, Q quadrature baseband signal components. Phase (32) and frequency (50) tracking loops reside on a common digital ASIC substrate (28). A complex multiplier (30) rotates digitized baseband signals by a digitized oscillation signal, producing Doppler shift compensated signals. The phase tracking loop (32) estimates data and generates a pure phase error signal from which data modulation and Doppler shift compensation influences have been removed, which drives a frequency discriminator (52) that identifies either clockwise or counterclockwise phase rotation for each symbol (18). An integrator (54) combines identification results over a burst and a numerically controlled oscillator (56) adjusts the digitized oscillation signal frequency in a constant frequency step. This adjustment takes place once for each burst.

1 Claim, 2 Drawing Sheets

DEMODULATOR WITH BASEBAND DOPPLER SHIFT COMPENSATION AND METHOD

TECHNICAL FIELD OF THE INVENTION

The present invention relates generally to digital communications. More specifically, the present invention relates to the compensation of Doppler frequency shift in demodulators.

BACKGROUND OF THE INVENTION

Radio receivers often need to precisely match the carrier frequency of a data communication signal in order to be able to accurately detect data conveyed by the data communication signal. A priori knowledge concerning a frequency at which the signal could have been transmitted helps in precisely matching the carrier frequency. Thus, a receiver may be tuned to a particular frequency or channel to receive a particular data communication signal.

However, a priori knowledge of a carrier frequency alone is often far too imprecise for accurate data detection. For example, when the transmitting and receiving devices move relative to one another, frequency offsets caused by the Doppler phenomenon are present, and when one of the transmitting and receiving devices is a satellite in a low earth orbit, these Doppler components may be very large. In addition, other factors, such as imprecise frequency and/or time bases and noise may influence the ability of a radio receiver to precisely match a carrier frequency. Any and all of these frequency offsets, regardless of the source, are referred to herein as Doppler.

Conventional receivers often use Doppler compensation feedback loops to remove Doppler, thereby allowing a receiver to precisely match a carrier frequency. Such Doppler compensation feedback loops often implement voltage or numerically controlled oscillators that operate at RF or IF frequencies. The oscillators tend to be complex devices which consume an undesirable amount of power. Excess complexity is undesirable because it tends to reduce reliability, and excess power consumption is particularly undesirable in satellites and portable radios that have limited battery reserves.

In addition, receivers which implement conventional Doppler compensation techniques show poor performance, particularly when used for burst communications. For example, when no signal is present, conventional Doppler compensation techniques tend to drive feedback loops from noise rather than legitimate signals. Consequently, Doppler compensation loops tend to readily drift off frequency.

When a bad burst is received, as characteristically occurs from time to time in connection with RF data communications, the frequency tracking loops may be driven far off frequency.

When a frequency tracking loop is driven off frequency, the receiver must then receive good data for a certain period of time before the frequency tracking loop is back on frequency. This period of time is typically larger the further the frequency tracking loop is off frequency to begin with. During this period, poor quality data are being detected. In addition, phase tracking loops, which typically operate in conjunction with frequency tracking loops to detect data, have trouble locking to a phase reference when the frequency reference is changing. The phase tracking loops tend not to operate properly until frequency tracking loops are on frequency. Thus, acquisition time is extended at the beginning of a burst because conventional frequency tracking loops are not sufficiently stable in frequency to permit phase tracking loops to successfully operate.

SUMMARY OF THE INVENTION

Accordingly, it is an advantage of the present invention that an improved demodulator for data communication signals and method therefor are provided.

Another advantage is that the present invention provides a demodulator that implements a Doppler feedback loop at baseband frequencies.

Another advantage is that the present invention provides a demodulator that compensates for Doppler in burst data communication signals.

Another advantage is that the present invention provides a demodulator that restricts the degree to which a Doppler frequency tracking loop may drift off frequency in the presence of a bad burst.

Another advantage is that the present invention provides a demodulator that improves frequency stability while a phase tracking loop is attempting to track a phase reference.

The above and other advantages of the present invention are carried out by a method of compensating for Doppler shifts at baseband or by an apparatus therefor. The method calls for converting a received signal into a baseband signal. The phase of the baseband signal is adjusted in response to an oscillation signal to produce a Doppler compensated signal. A determination is made concerning whether an average frequency exhibited by the Doppler compensated signal is greater or less than a reference signal frequency. The frequency of the oscillation signal is controlled in response to this determination.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
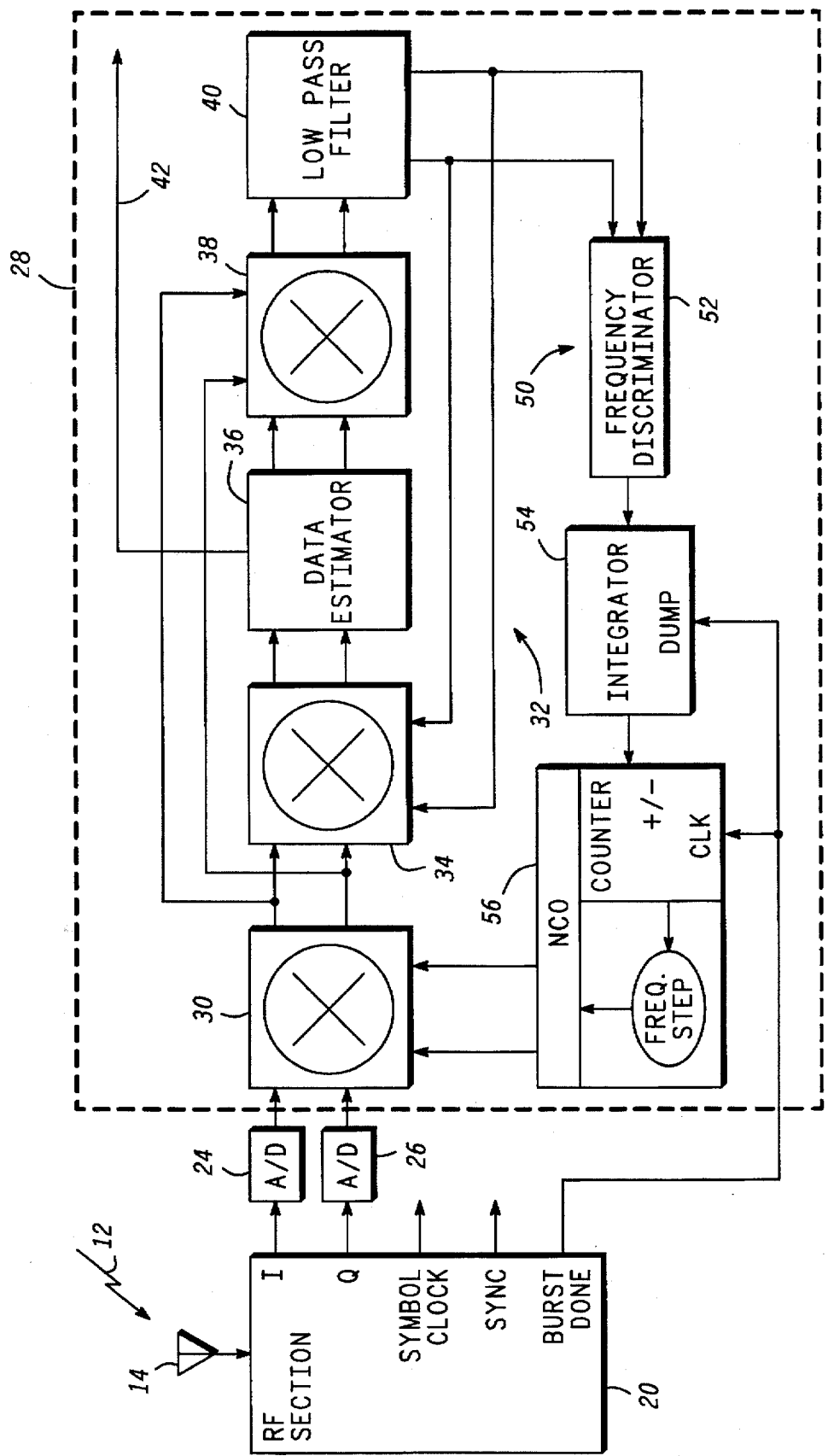
FIG. 1 is a block diagram of a data communication demodulator configured in accordance with the present invention.
Figure 2:
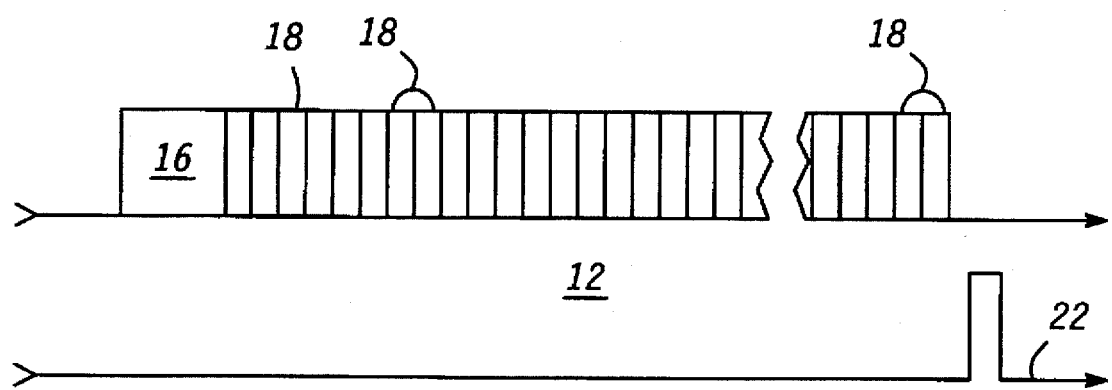
FIG. 2 is a timing diagram of a burst data communication signal received by the demodulator.

FIG. 1 is a block diagram of data communication demodulator 10. Demodulator 10 is configured to receive RF data communication signal 12 at antenna 14. FIG. 2 is an exemplary timing diagram of data communication signal 12. In the preferred embodiment, signal 12 represents a burst, rather than a continuous signal, and is referred to as either signal 12 or burst 12 below. When burst 12 is active, data are being conveyed, but when burst 12 is not active, demodulator 10 may receive only noise. Data may be conveyed through relative phase relationships between I and Q quadrature components of signal 12 using any of many well known data modulation techniques.

Preamble portion 16 of burst 12 conveys data helping demodulator 10 (FIG. 1) synchronize itself to the data modulation. Following preamble 16, burst 12 is temporally configured into any number of symbols 18 which convey any amount of data. A symbol 18 represents a discrete duration or time interval in which a predetermined number of bits of data are conveyed. This discrete symbol duration causes symbols 18 to occur at a symbol rate. In one preferred embodiment, the symbol rate is in the 3 MHz to 25 MHz range, but other ranges, e.g., 20 MHz to 100 MHz range are also feasible. The actual data rate may be higher than the symbol rate. As an example, for quadrature phase shift keyed (QPSK) modulation, two bits of data are conveyed during each symbol 18. Burst 12 may include any number of symbols 18.

Antenna 14 (FIG. 1) couples to RF section 20, which uses conventional techniques to down-convert signal 12 to baseband and to achieve carrier and bit synchronization. However, those skilled in the art will appreciate that in converting the RF communication signal 12 to baseband, RF section 20 need not remove all of the carrier offset. Remaining components of demodulator 10 compensate for Doppler shifts that may be present in the baseband signal generated by RF section 20. The quadrature components of this baseband signal are generated by RF section 20 at I and Q outputs. A symbol clock output provides a timing signal that tracks symbols 18 (FIG. 2). FIG. 1 omits illustrating connections for the symbol clock signal generation. In one embodiment suitable for QPSK signal demodulation, the symbol clock is generated by RF section 20 (as illustrated, FIG. 1) because the symbol clock drives substantially all remaining circuits in demodulator 10 in a manner easily understood by those skilled in the art. Alternatively, for offset QPSK signal demodulation, the symbol clock may be derived from the derotated data (this arrangement is not illustrated), i.e., from the signals output by complex multiplier 34. A synchronization signal activates when RF section 20 has synchronized to burst 12.

I output of RF section 20 couples to analog-to-digital converter (A/D) 24 and Q output of RF section 20 couples to A/D 26. A/Ds 24, 26 digitize I, Q signals so that one I sample and one Q sample are available for each symbol 18 (FIG. 2). RF section 20 also generates a "burst done" signal 22, a timing diagram of which is shown in FIG. 2. Generally, burst done signal 22 may activate a pulse when the end of burst 12 is detected.

Outputs of A/Ds 24, 26 and the burst done output of RF section 20 couple to common substrate 28 upon which additional circuits used by demodulator 10 reside. In the preferred embodiment, common substrate 28 is a digital application specific integrated circuit (ASIC). Those skilled in the art understand that ASICs may be manufactured inexpensively in quantity and are routinely configured to operate reliably while consuming low power. Those skilled in the art further understand that by operating at a symbol rate, common substrate 28 processes signals generally exhibiting rates of change equal to the symbol rate or slower. In particular, common substrate 28 includes a Doppler compensation loop, discussed below, which operates substantially at baseband rather than at IF or RF frequencies.

Referring to common substrate 28 of demodulator 10, outputs of I, Q A/Ds 24, 26 couple to first I, Q inputs, respectively, of complex multiplier 30. Second I, Q inputs of multiplier 30 receive an oscillation signal, presented as digital quadrature values changing from symbol 18 to symbol 18 but remaining constant throughout substantially the entire duration of each symbol 18. Thus, multiplier 30 serves as a phase rotator that, for each symbol 18, alters or adjusts the phase relationship expressed by the baseband signal I, Q samples. This phase adjustment largely compensates for Doppler shifts. The output of multiplier 30 provides a Doppler compensated signal.

The Doppler compensated signal drives phase tracking loop 32, which includes complex multiplier 34, data estimator 36, complex multiplier 38 and low pass filter 40. In particular, I, Q outputs from multiplier 30 couple to first I, Q inputs of complex multipliers 34, 38, respectively. I, Q outputs of multiplier 34 couple to I, Q inputs, respectively, of data estimator 36, and I, Q outputs of data estimator 36 couple to second I, Q inputs of complex multiplier 38. I, Q outputs of multiplier 38 couple to I, Q inputs, respectively, of low pass filter 40 and I, Q outputs of filter 40 couple to second I, Q inputs, respectively, of multiplier 34.

Multiplier 34 represents another phase rotator that rotates the phase relationship expressed in the Doppler compensated signal by a pure phase error signal, as expressed at the output of filter 40. The output of multiplier 34 is a phase compensated signal that data estimator 36 evaluates, for each symbol 18, in determining which data are being conveyed. This data estimate is provided at output 42.

Figure 3:
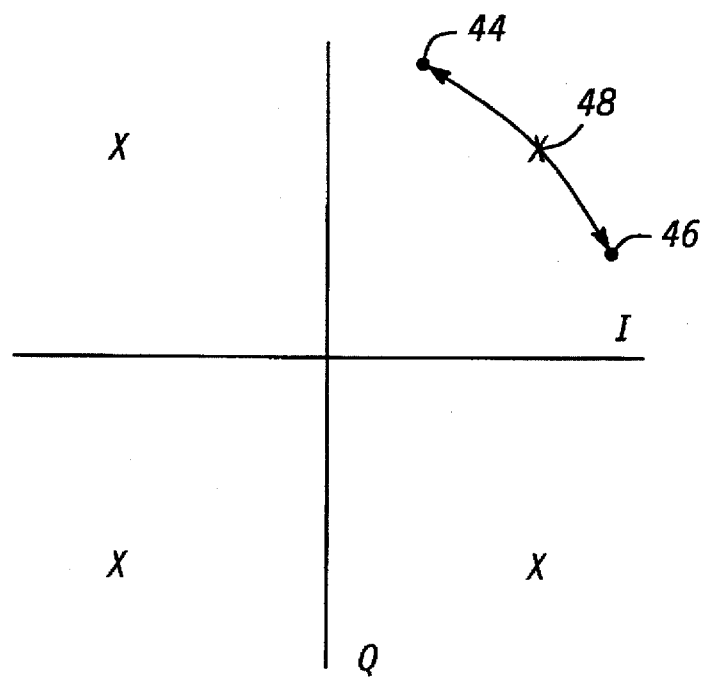
FIG. 3 is a phase constellation diagram depicting how data are conveyed by the data communication signal.

FIG. 3 is a phase constellation diagram illustrating operation of data estimator 36. FIG. 3 shows a QPSK phase constellation for the purposes of illustration only. Those skilled in the art understand that the present invention is not limited to that single modulation technique. Four possible theoretical ideal phase relationships between I, Q components are illustrated at "X's" in FIG. 3, defining a theoretical reference signal exhibiting only one of the ideal phase relationships during each symbol 18, determined in response to data conveyed by signal 12.

The theoretical reference signal would cause these ideal phase relationships to be provided to data estimator 36 for four different data states if no uncompensated Doppler shift, noise, error or other inaccuracy were introduced before or during demodulation. However, uncompensated Doppler shifts, noise, error and other inaccuracies are invariably introduced into actual signals, and the detected phase relationships presented to data estimator 36 typically do not precisely match the theoretical ideal phase relationships. Examples of two of such actual phase relationships 44, 46 expressed by the phase compensated signal are illustrated by dots in FIG. 3. Of course, only one phase relationship occurs during any one symbol 18 (FIG. 2), and relationships 44, 46 depict examples from two arbitrary symbols 18.

Data estimator 36 decides which of the theoretical reference phase relationships is closest to the actual phase relationship expressed in the phase compensated signal. For the actual relationships 44, 46 depicted in FIG. 3, that reference phase relationship is indicated at the "X" bearing reference number 48. Data estimator 36 outputs a data code corresponding to this reference phase relationship, representing the data estimate for the current symbol 18. Data estimator 36 also outputs I, Q values indicating the phase error and which drive multiplier 38 (FIG. 1). This phase error describes how far and in which direction the actual phase relationship expressed in the phase compensated signal is removed from the closest reference phase. The phase error may be in either a clockwise (CW) direction (e.g., phase relationship 46) or counterclockwise (CCW) direction (e.g., phase relationship 44).

Multiplier 38 (FIG. 1) rotates the Doppler compensated signal by an amount corresponding to the phase error signal. The resulting phase rotation at the output of multiplier 38 represents pure phase error removed from the current Doppler shift compensation and data modulation. This pure phase error is filtered in filter 40 and fed back to multiplier 34. Thus, phase tracking loop 32 continuously tracks phase error resulting after Doppler shift compensation. Filter 40 is desirably a relatively narrow band filter, limiting the rate of phase error change (rotation) by loop 32.

Since the rate of phase error change by loop 32 is limited, frequency tracking loop 50 operates to control the oscillation signal's frequency so that the Doppler shift compensated signal remains within the range of phase tracking loop 32. Frequency tracking loop 50 includes multiplier 30, phase tracking loop 32, frequency discriminator 52, integrator 54 and numerically controlled oscillator (NCO) 56.

Frequency discriminator 52 has I, Q inputs coupled to I, Q outputs of filter 40. An output of frequency discriminator 52 couples to integrator 54 and accumulation output of integrator 54 couples to increment/decrement (+/−) input of NCO 56. NCO 56 has I, Q outputs that together provide the oscillation signal, typically at the symbol rate or an integer multiple thereof. The "burst done" output from RF section 20 couples to frequency step counter clock input of NCO 56 and to dump input of integrator 54.

The output of filter 40 describes pure phase error, removed from Doppler shift compensation and data modulation. Frequency discriminator 52 evaluates this phase error to identify whether it is CW or CCW, which identification is determined relative to existing Doppler shift compensation and data modulation. In other words, frequency discriminator 52 determines, for each symbol, whether the frequency of the actual received signal appears to be greater than or less than the frequency of the theoretical reference signal. Data estimated by data estimator 36 identifies the theoretical reference signal; phase error output from data estimator 36 removes data modulation phase; and pure phase error output from multiplier 38 removes Doppler shift compensation phase for current symbol 18.

This determination for any single symbol 18 means little for determining how to control Doppler shift compensation. Thus, integrator 54 combines results from several symbols 18. If the results indicate a tendency for CW rotation on average, then the frequency of the oscillation signal needs to change in one direction. If the results indicate a tendency for CCW rotation on average, then the frequency of the oscillation signal needs to change in the other direction. Those skilled in the art understand that an average frequency relationship does not necessarily imply a precise mathematical operation but rather an operation based upon several events occurring over time.

In response to activation of the burst done signal, integration results either increment or decrement a frequency step used by NCO 56 and integrator 54 is dumped in preparation for a subsequent burst 12. The update rate of NCO 56 is set to an integer multiple of the symbol rate. The frequency step represents a constant frequency offset in either a positive or negative direction. NCO 56 is configured so that this frequency step is small enough to permit phase tracking loop 32 to track over a range greater than a single frequency step. On the other hand, the frequency step is large enough to track the largest expected Doppler shift change from burst to burst.

Regardless of the amount of Doppler shift error, frequency loop 50 adjusts only a constant amount. Thus, a bad burst 12 cannot pull loop 50 far off frequency. Additionally, the frequency adjustment is performed in response only to signal accumulated at integrator 54 during a burst 12 and not to noise which may be received when a burst 12 is not active. Frequency loop 50 is configured to permit frequency change only once for each burst 12. In other words, NCO 56 is configured to refrain from altering its oscillation frequency during a burst 12. Thus, Doppler shift compensation remains stable during a burst 12 and phase loop 32 more easily achieves phase lock.

In a preferred embodiment, frequency loop 50 adjusts several times during a first burst to acquire the signal to be demodulated and then adjusts once per burst to track the acquired signal. This arrangement allows rapid (single-burst) locking and maintains locking during signal tracking. For example, a single bad burst does not readily break lock when frequency loop 50 is tracking.

In summary, the present invention provides an improved demodulator for data communication signals and a method therefor. The present invention provides a demodulator that implements a Doppler shift feedback loop at baseband frequencies. The feedback loop is implemented digitally on a common ASIC substrate. Thus, Doppler shift compensation is achieved in a reliable manner and at a low power consumption expense. The present invention provides a demodulator compensating for Doppler shifts in burst data communication signals. Further, the present invention provides a demodulator that prevents Doppler shift tracking in response to noise that may be present when a burst is not active. The present invention also restricts the degree to which a Doppler frequency tracking loop may drift off frequency in response to a bad burst. In addition, the present invention improves frequency stability of a Doppler tracking loop so that frequency changes do not occur while a phase tracking loop is attempting to lock onto a phase reference.

The present invention has been described above with reference to preferred embodiments. However, those skilled in the art will recognize that changes and modifications may be made in these preferred embodiments without departing from the scope of the present invention. For example, the embodiments described herein operate substantially in accordance with a rectangular coordinate system. However, those skilled in the art may devise equivalent demodulators which operate in accordance with polar coordinates. In such demodulators rectangular to polar coordinate converters may be used, and complex multipliers may be replaced with adders. These and other changes and modifications which are obvious to those skilled in the art are intended to be included within the scope of the present invention.

What is claimed is:

1. A data communication signal demodulator with baseband Doppler frequency shift compensation, said demodulator comprising:

means for generating digitized quadrature samples of a received signal temporally configured into symbols;

a first phase rotator including first signal inputs coupled to said means for generating and providing a Doppler frequency shift compensated signal at first outputs, said first phase rotator for rotating phases expressed by said quadrature samples in response to an oscillation signal provided to first clock inputs thereof;

a phase tracking loop including inputs coupled to said first outputs, said phase tracking loop comprising a second phase rotator including second signal inputs coupled to said first outputs and including second outputs, a data estimator including inputs coupled to said second outputs and including outputs coupled to third signal inputs of a third phase rotator, said third phase rotator including third reference signal inputs coupled to said first outputs;

a low pass filter including inputs coupled to outputs of said third said third phase rotator and including outputs coupled to second reference signal inputs of said second phase rotator;

a frequency discriminator including inputs coupled to outputs of said low pass filter, said frequency discriminator for determining during each symbol whether a frequency exhibited by said Doppler shift compensated signal is greater or less than a reference signal frequency;

an integrator including an input coupled to an output of said frequency discriminator; and a numerically controlled oscillator including an input coupled to an output of said frequency discriminator and outputs coupled to said first clock inputs of said first phase rotator, said numerically controlled oscillator for producing said oscillation signal.

* * * * *